United States Patent
Wallner et al.

(10) Patent No.: US 9,292,378 B2
(45) Date of Patent: Mar. 22, 2016

(54) SINGLE EVENT UPSET PROTECTION CIRCUIT AND METHOD

(71) Applicant: TELEDYNE SCIENTIFIC & IMAGING, LLC, Thousand Oaks, CA (US)

(72) Inventors: John Wallner, Camarillo, CA (US); Michael Gorder, Westlake Village, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 181 days.

(21) Appl. No.: 14/290,648

(22) Filed: May 29, 2014

(65) Prior Publication Data
US 2015/0347222 A1  Dec. 3, 2015

(51) Int. Cl.
*G06F 11/00* (2006.01)
*H03M 13/00* (2006.01)
*G06F 11/10* (2006.01)

(52) U.S. Cl.
CPC ............................ *G06F 11/10* (2013.01)

(58) Field of Classification Search
CPC ...................................................... G06F 11/10
See application file for complete search history.

(56) References Cited

U.S. PATENT DOCUMENTS

| | | | |
|---|---|---|---|
| 5,657,267 A | 8/1997 | Levi | 365/149 |
| 5,898,711 A | 4/1999 | Buer | 371/49.1 |
| 6,549,443 B1 | 4/2003 | Jensen et al. | 365/56 |
| 6,901,532 B2 | 5/2005 | DeRuiter et al. | 714/5 |
| 7,161,404 B2 | 1/2007 | Hazucha et al. | 327/203 |
| 7,236,001 B2 | 6/2007 | Fulkerson | 326/12 |
| 7,489,538 B2 | 2/2009 | Maki et al. | 365/154 |
| 7,620,883 B1 | 11/2009 | Carmichael et al. | 714/797 |
| 7,852,107 B1 * | 12/2010 | Sundararajan ... | H03K 19/00338 326/10 |

* cited by examiner

*Primary Examiner* — Sam Rizk
(74) *Attorney, Agent, or Firm* — Koppel, Patrick, Heybl & Philpott

(57) ABSTRACT

An SEU protection circuit comprises first and second storage means for receiving primary and redundant versions, respectively, of an n-bit wide data value that is to be corrected in case of an SEU occurrence; the correction circuit requires that the data value be a 1-hot encoded value. A parity engine performs a parity operation on the n bits of the primary data value. A multiplexer receives the primary and redundant data values and the parity engine output at respective inputs, and is arranged to pass the primary data value to an output when the parity engine output indicates 'odd' parity, and to pass the redundant data value to the output when the parity engine output indicates 'even' parity. The primary and redundant data values are suitably state variables, and the parity engine is preferably an n-bit wide XOR or XNOR gate.

9 Claims, 2 Drawing Sheets

SINGLE EVENT UPSET PROTECTION CIRCUIT AND METHOD

GOVERNMENT RIGHTS

This invention was made with Government support under US Department of Energy Contract No. DE-AC04-94AL85000. The Government has certain rights in this invention.

BACKGROUND OF THE INVENTION

1. Field of the Invention

This invention relates generally to single event upset (SEU) protection techniques, and more particularly to the protection and correction of state machine variables from SEUs.

2. Description of the Related Art

A single event upset (SEU) is a change in the state of a data bit that occurs due to ions or electromagnetic radiation striking a sensitive node in an electronic circuit; circuitry operating in space is particularly vulnerable to SEUs. A typical example is a storage element in a digital circuit, which might change state when exposed to radiation.

There are several engineering approaches to help ameliorate this problem. For example, circuitry can be designed using costly radiation-hardened processes. Another conventional approach to SEU protection is to use "triple-redundancy" and a voting circuit; this is illustrated in FIG. 1. Rather than use a single storage element to store a data bit, the bit is stored in three storage elements 10, 12, 14—here, D flip-flops connected to common data and clock lines. The Q outputs 16, 18, 20 of the flip-flops are provided to a voting circuit 22, which passes whichever data bit value is present on at least two of the three Q outputs on to an output 24. In this way, if one of the storage elements is "upset", the other two storage elements out-vote it and hence the circuit still functions properly. However, this approach requires a considerable amount of logic and circuitry to function.

SUMMARY OF THE INVENTION

An SEU protection circuit and method are presented which address the problems noted above, in that they provide the same benefits as a triple-redundancy approach but with less logic and no voting circuit.

The present SEU correction circuit comprises first and second storage means for receiving primary and redundant versions, respectively, of an n-bit wide data value that is to be corrected in case of an SEU occurrence; the correction circuit requires that the data value be a 1-hot encoded value. A parity engine is arranged to perform a parity operation on the n bits of the primary data value, and to provide the results at an output. A multiplexer is connected to receive the primary data value, the redundant data value, and the parity engine output at respective inputs, and is arranged to pass the primary data value to an output when the parity engine output indicates 'odd' parity, and to pass the redundant data value to the output when the parity engine output indicates 'even' parity. The primary and redundant data values are suitably state variables, and the parity engine is preferably an n-bit wide exclusive-OR (XOR) or exclusive-NOR (XNOR) gate.

These and other features, aspects, and advantages of the present invention will become better understood with reference to the following drawings, description, and claims.

DETAILED DESCRIPTION OF THE INVENTION

Figure 2:
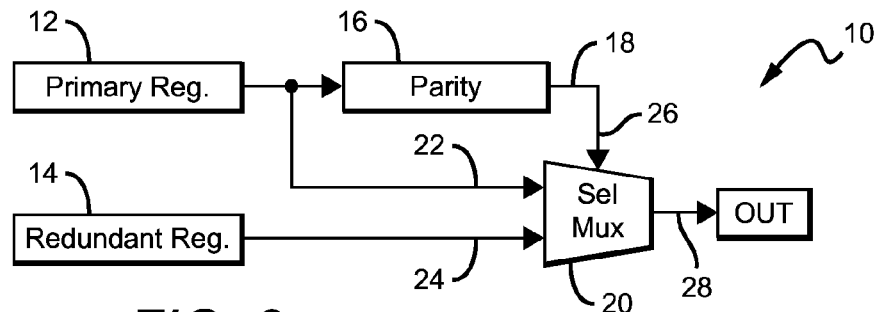
FIG. 2 is a block diagram of one possible embodiment of an SEU protection circuit per the present invention.

The basic principles of an SEU protection circuit per the present invention are shown in FIG. 2. The circuit 10 comprises a first storage means 12 for receiving a primary version of an n-bit wide data value that is to be corrected in case of an SEU occurrence, and a second storage means 14 for receiving a redundant version of the data value. Storage means 12 and 14 are suitably registers, though other storage means such as flip-flops might also be used. Both the primary and redundant data values must be 1-hot encoded values; if a data value to be protected is not a 1-hot encoded value, it must be converted into a 1-hot encoded value if it is to be protected from SEU occurrences by the present circuit.

Circuit 10 also includes a parity engine 16 arranged to perform a parity operation on the n bits of the primary data value stored in storage means 12, and to provide the results of the parity operation at an output 18. Since the stored 1-hot encoded data value will normally have a single '1' and n-1 '0's, the result of the parity operation will be a 1 ('odd' parity). However, if the stored value has experienced an SEU, it will have two '1's and n-2 '0's (if one of the bits that should be a 0 gets flipped by the SEU), or n '0's (if the single '1' gets flipped), in which case output 18 will be a 0 ('even' parity). Parity engine 16 is preferably an XOR or XNOR gate, though any circuit capable of determining the parity of an n-bit data word could be used.

Circuit 10 also includes a multiplexer 20, connected to receive the primary data value stored in first storage means 12 at a first set of inputs 22, the redundant data value stored in second storage means 14 at a second set of inputs 24, and the output 18 of parity engine 16 at a 'select' input 26. Multiplexer 20 is arranged to pass the primary data value to an output 28 when parity engine output 18 indicates 'odd' parity, and to pass the redundant data value to output 28 when the parity engine output indicates 'even' parity. In this way, circuit 10 will output the redundant data value stored in storage means 14 upon the occurrence of an SEU to the stored primary data value.

The data values to be protected are suitably state variables associated with one or more state machines. The state machines are preferably designed such that their state variables are 1-hot encoded values, with no 'zero' state; this eliminates the need to convert a non-encoded state variable to a 1-hot encoded value. This arrangement also enables invalid states to be easily detected with a parity engine, since each valid state will have exactly 1 bit that is non-zero. As such, the parity of each valid state will be 'odd' (or '1'), causing the primary data value to be passed to the output, while a single bit upset to a state variable will cause it to have even parity (or '0'), causing the redundant data value to be passed to the output. The state machines would typically be designed such that the detection of an SEU causes the state machine to transition to a default 'start' or 'idle' state.

Figure 3:
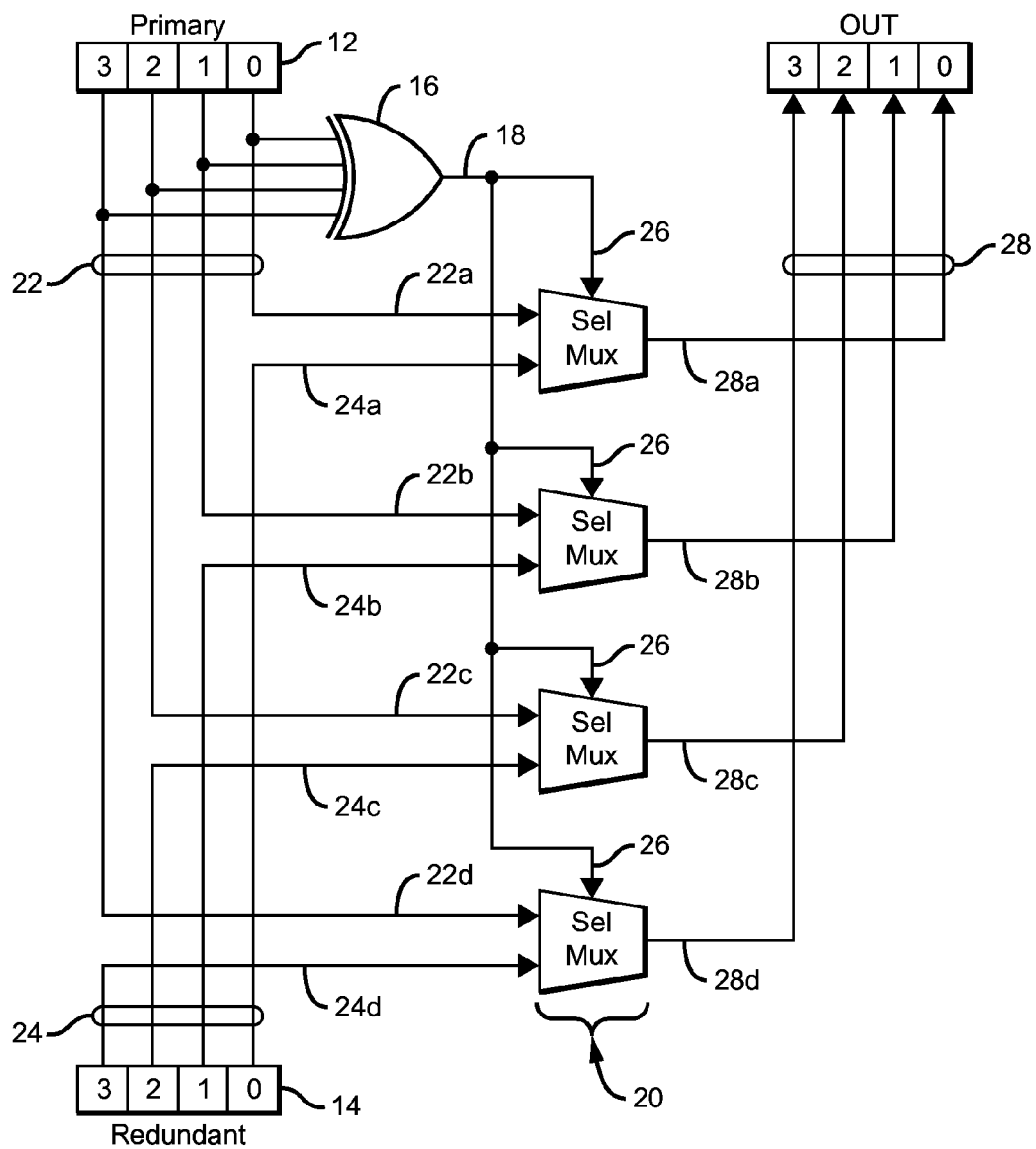
FIG. 3 is a schematic diagram of one possible embodiment of an SEU protection circuit per the present invention.

A schematic diagram of one possible implementation of the present SEU protection circuit is shown in FIG. 3. For this example, first and second storage means 12 and 14 are 4-bit registers which hold primary and redundant versions of a 1-hot encoded value, respectively. Parity engine 16 is implemented with a 4-input XOR gate, and multiplexer 20 is implemented with four individual multiplexers dedicated to respective bits of the 1-hot encoded value. The output 18 from parity engine 16 is delivered to the 'select' input on each of the individual multiplexers. Each multiplexer is arranged to pass the primary data value bit (22a, 22b, 22c, 22d) present at its input to its output (28a, 28b, 28c, 28d) when parity engine output 16 indicates 'odd' parity, and to pass the corresponding redundant data value bit (24a, 24b, 24c, 24d) to its output when the parity engine output indicates 'even' parity. In this way, the present circuit detects the occurrence of an SEU, corrects the corrupted bit, and presents the corrected data value at an output. SEU protection is provided without requiring triple-redundancy and a voting circuit, or a true error detection and correction (EDAC) circuit, as are known in the art.

Though the exemplary embodiment shown in FIG. 3 accommodates a 4-bit 1-hot encoded data value, the present circuit could be scaled up or down as necessary to accommodate a 1-hot encoded data value of any width.

The present circuit is preferably implemented in hardware using combinatorial logic, though other implementation techniques, such as a programmed microprocessor, might also be used.

Figure 1:
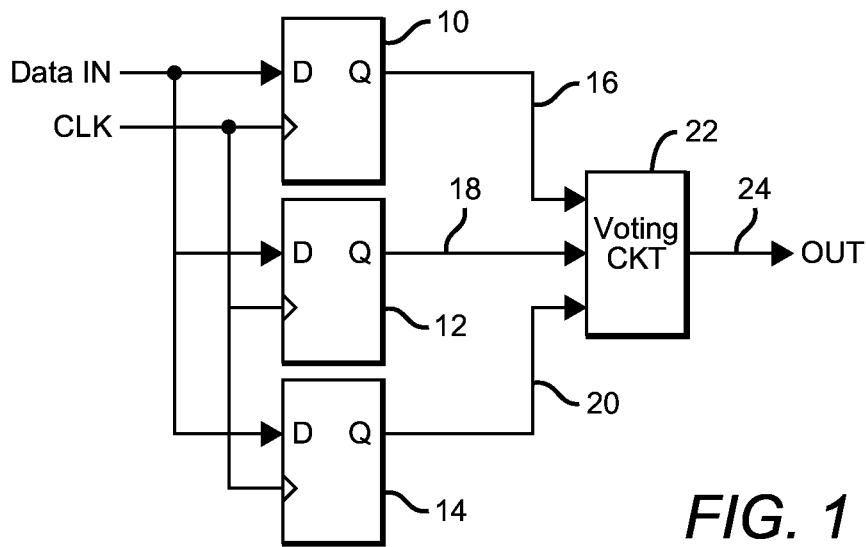
FIG. 1 is a schematic diagram of a known SEU detection circuit.
Figure 4:
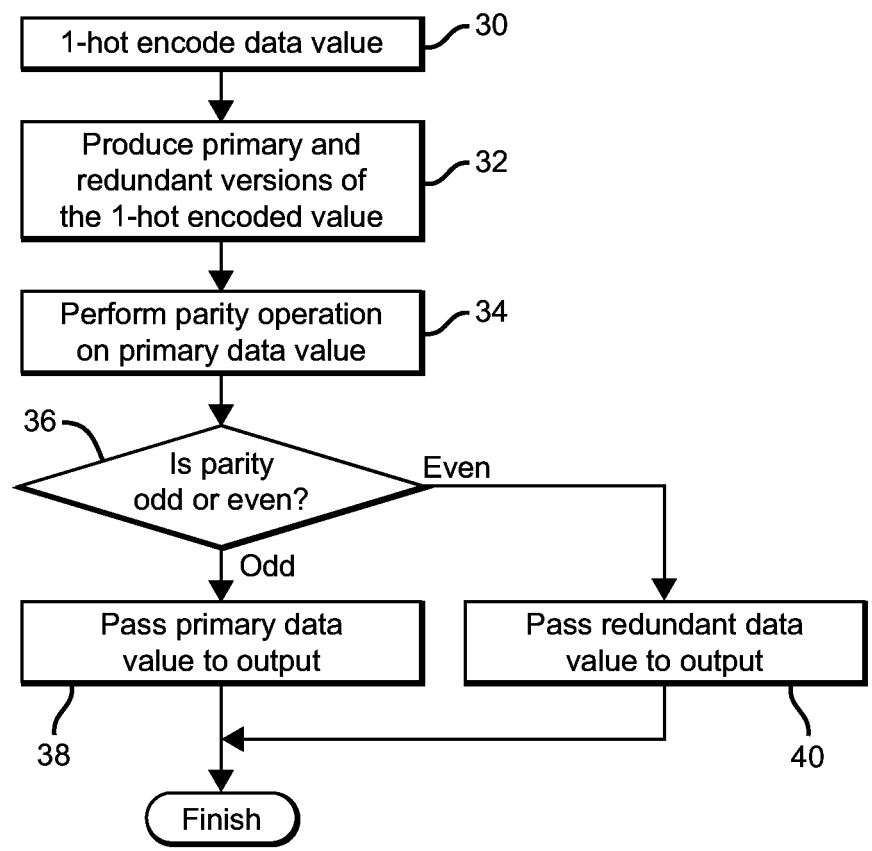
FIG. 4 is a flow diagram illustrating a method of protecting a digital data value from an SEU per the present invention.

A flow chart illustrating the present method of protecting a digital data value from a single event upset (SEU) is shown in FIG. 4. In an optional first step (30), a data value to be protected is encoded using 1-hot encoding to form an n-bit 1-hot encoded data value. As noted above, this step may not be necessary if the circuit generating the data value is designed to generate 1-hot encoded data values directly.

In step 32, primary and redundant versions of the n-bit 1-hot encoded data value are produced. A parity operation is then performed on the n bits of the primary data value (step 34). A final step of selecting which of the primary or redundant data values to pass on to the output is dependent on the parity indicated by the result of the parity operation (step 36). If the parity is 'odd', the primary data value is passed on to the output (step 38). However, if the parity is 'even', the redundant data value is passed on to the output (step 40).

The step of selecting the primary or redundant data value to be passed on to the output preferably comprises:
passing the first bit of the primary data value to the output when the parity operation indicates 'odd' parity or passing the first bit of the redundant data value to the output when the parity operation indicates 'even' parity;
passing the second bit of the primary data value to the output when the parity operation indicates 'odd' parity or passing the second bit of the redundant data value to the output when the parity operation indicates 'even' parity;
repeating this process for each of the n bits of the primary and redundant data values.

The present circuit and method are particularly well-suited for use with digital state machines in hardware where SEU is a concern, such as with flight or space hardware. However, the circuit and method could be employed for use with any 1-hot encoded data value to be protected from the occurrence of an SEU, regardless of source.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A single event upset (SEU) correction circuit for n-bit wide data values, comprising:
first and second storage means for receiving primary and redundant versions, respectively, of an n-bit wide data value that is to be corrected in case of an SEU occurrence, said data values being 1-hot encoded values;
a parity engine arranged to perform a parity operation on the n bits of said primary data value and to provide the results of said operation at an output; and
a multiplexer connected to receive said primary data value, said redundant data value, and said parity engine output at respective inputs, said multiplexer arranged to pass said primary data value to an output when said parity engine output indicates 'odd' parity and to pass said redundant data value to said output when said parity engine output indicates 'even' parity.

2. The circuit of claim 1, wherein said primary and redundant data values are state variables.

3. The circuit of claim 1, wherein said parity engine comprises an n-bit wide XOR or XNOR gate.

4. The circuit of claim 1, wherein said multiplexer comprises n multiplexer circuits, each of which receives a respective one of said n bits of said primary data value, the corresponding bit from said redundant data value, and said parity engine output at respective inputs, each of said multiplexer circuits arranged to pass said primary data value bit to an output when said parity engine output indicates 'odd' parity and to pass said corresponding redundant data value bit to said output when said parity engine output indicates 'even' parity.

5. A single event upset (SEU) correction circuit for n-bit wide state variables, comprising:
first and second registers for receiving primary and redundant versions, respectively, of an n-bit wide state variable that is to be corrected in case of an SEU occurrence, said state variables being 1-hot encoded values;
a parity engine arranged to perform an exclusive-OR or exclusive-NOR operation on the n bits of said primary data value and to provide the results of said operation at an output, said parity engine comprising an n-bit wide XOR or XNOR gate; and
n multiplexer circuits, each of which receives a respective one of said n bits of said primary state variable, the corresponding bit from said redundant state variable, and said parity engine output at respective inputs, each of said multiplexer circuits arranged to pass said primary state variable bit to an output when said parity engine output indicates 'odd' parity and to pass said corresponding redundant state variable bit to said output when said parity engine output indicates 'even' parity.

6. A method of protecting a digital data value from a single event upset (SEU), comprising:
encoding a data value to be protected using 1-hot encoding to form an n-bit 1-hot encoded data value;
providing primary and redundant versions of said n-bit 1-hot encoded data value;
performing a parity operation on the n bits of said primary data value; and
selecting said primary data value to be passed on to an output when said parity operation indicates 'odd' parity and selecting said redundant data value to be passed on to said output when said parity operation indicates 'even' parity.

7. The method of claim 6, wherein said data values to be protected are state variables.

8. The method of claim 6, wherein said selecting said primary or redundant data value to be passed on to said output comprises:

passing said first bit of said primary data value to said output when said parity operation indicates 'odd' parity and passing said first bit of said redundant data value to said output when said parity operation indicates 'even' parity;

passing said second bit of said primary data value to said output when said parity operation indicates 'odd' parity and passing said second bit of said redundant data value to said output when said parity operation indicates 'even' parity;

and so on for each of the n bits of said primary and redundant data values.

9. The method of claim 6, wherein performing said parity operation comprises performing an exclusive-OR or an exclusive-NOR operation.

* * * * *